United States Patent
Kim et al.

(10) Patent No.: US 10,516,448 B2
(45) Date of Patent: Dec. 24, 2019

(54) BEAM OPERATION DEVICE AND METHOD IN COMMUNICATION SYSTEM SUPPORTING HYBRID MULTIPLE-INPUT MULTIPLE-OUTPUT MODE

(71) Applicants: Samsung Electronics Co., Ltd., Gyeonggi-do (KR); Korea Advanced Institute of Science and Technology, Daejeon (KR)

(72) Inventors: Jae-Won Kim, Seoul (KR); Yong-Hun Lee, Daejeon (KR); Min-Hyun Kim, Busan (KR); Jun-Ho Lee, Namyangju-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/532,943

(22) PCT Filed: Dec. 2, 2015

(86) PCT No.: PCT/KR2015/013084
§ 371 (c)(1),
(2) Date: Jun. 2, 2017

(87) PCT Pub. No.: WO2016/089120
PCT Pub. Date: Jun. 9, 2016

(65) Prior Publication Data
US 2018/0269934 A1    Sep. 20, 2018

(30) Foreign Application Priority Data

Dec. 2, 2014   (KR) .................. 10-2014-0170688

(51) Int. Cl.
*H04B 7/0408* (2017.01)
*H04B 7/0417* (2017.01)
(Continued)

(52) U.S. Cl.
CPC ......... *H04B 7/0417* (2013.01); *H04B 7/0684* (2013.01); *H04B 7/0695* (2013.01);
(Continued)

(58) Field of Classification Search
CPC .. H04B 7/0417; H04B 7/0408; H04B 7/0684; H04B 7/0626; H04L 25/0204; H04W 72/0413
See application file for complete search history.

(56) References Cited

U.S. PATENT DOCUMENTS 8,229,352 B2    7/2012  Doan et al.
8,290,539 B2 *  10/2012  Li .................. H04L 1/0017
                                                    375/260
(Continued)

FOREIGN PATENT DOCUMENTS

KR    101412166 B1    7/2014

OTHER PUBLICATIONS

International Search Report dated Feb. 29, 2016 in connection with International Patent Application No. PCT/KR2015/013084.
(Continued)

*Primary Examiner* — Kenneth T Lam

(57) ABSTRACT

The present invention relates to a 5th-generation (5G) or pre-5G communication system to be provided for supporting a data transmission rate higher than that of a 4th-generation (4G) communication system, such as long term evolution (LTE), and subsequent systems. The present invention provides a method by which a mobile station (MS) operates a beam in a communication system supporting a hybrid multiple-input multiple-output (MIMO) mode, the method com-
(Continued)

US 10,516,448 B2

Page 2 prising the steps of: receiving, from a base station (BS), information related to the number of beams to be used, by the BS, for a beam training process; receiving, from the BS, a downlink reference signal (RS); performing a channel estimation process on the basis of the downlink RS; and transmitting, to the BS, information related to the number of beams to be used by the MS, after performing the channel estimation process.

12 Claims, 10 Drawing Sheets

(51) Int. Cl.
  *H04B 7/06* (2006.01)
  *H04L 25/02* (2006.01)
  *H04W 72/04* (2009.01)
  *H04W 16/28* (2009.01)
  *H04B 7/08* (2006.01)

(52) U.S. Cl.
  CPC ......... *H04B 7/088* (2013.01); *H04L 25/0204* (2013.01); *H04W 16/28* (2013.01); *H04W 72/0413* (2013.01); *H04B 7/0408* (2013.01); *H04B 7/0626* (2013.01); *H04L 25/0206* (2013.01); *H04W 72/046* (2013.01)

(56) References Cited

U.S. PATENT DOCUMENTS 9,178,590 B2 * 11/2015 Kuo ..................... H04B 7/0478
2010/0330928 A1 * 12/2010 Prasad ................. H04B 7/0695
  455/69
2011/0211490 A1 * 9/2011 Nikula ................. H04B 7/086
  370/252
2011/0261905 A1 * 10/2011 Shental ............... H04L 25/0202
  375/316
2012/0155300 A1 * 6/2012 Noh ...................... H04L 1/0026
  370/252
2013/0065622 A1 * 3/2013 Hwang ................. H04W 16/28
  455/500
2013/0156120 A1 * 6/2013 Josiam ................. H04B 7/0697
  375/260
2013/0272220 A1 * 10/2013 Li ....................... H04W 72/046
  370/329
2015/0341095 A1 * 11/2015 Yu ....................... H04B 7/0619
  370/252
2016/0043781 A1 * 2/2016 Cho ..................... H04L 5/0051
  342/373
2016/0088648 A1 * 3/2016 Xue .................... H04B 7/0452
  370/252
2017/0026102 A1 * 1/2017 Guo .................... H04B 7/063
2017/0064748 A1 * 3/2017 Cai ..................... H04B 7/0617
2017/0163452 A1 * 6/2017 Breiling ........... H04L 25/03159
2017/0257230 A1 * 9/2017 Son .................... H04B 7/0695
2017/0273063 A1 * 9/2017 Kim ................... H04B 7/0617

OTHER PUBLICATIONS

Written Opinion of the International Searching Authority dated Feb. 29, 2016 in connection with International Patent Application No. PCT/KR2015/013084.

* cited by examiner

BEAM OPERATION DEVICE AND METHOD IN COMMUNICATION SYSTEM SUPPORTING HYBRID MULTIPLE-INPUT MULTIPLE-OUTPUT MODE

CROSS-REFERENCE TO RELATED APPLICATION(S)

The present application claims priority under 35 U.S.C. § 365 to International Patent Application No. PCT/KR2015/013084 filed on Dec. 2, 2015, entitled "BEAM OPERATION DEVICE AND METHOD IN COMMUNICATION SYSTEM SUPPORTING HYBRID MULTIPLE-INPUT MULTIPLE-OUTPUT MODE", and, to Korean Patent Application No. 10-2014-0170688 filed on Dec. 2, 2014, each of which are incorporated herein by reference into the present disclosure as if fully set forth herein.

TECHNICAL FIELD

The present disclosure relates to an apparatus and method for operating a beam in a communication system supporting a hybrid multiple-input multiple-output (MIMO) scheme, and more particularly, to an apparatus and method for operating a beam by considering a millimeter wave (mm-wave) cellular communication in a communication system supporting a hybrid MIMO scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

A wireless communication system has been progressed to support a higher data rate to satisfy a continuously increased demand for wireless data traffic. For example, a wireless communication system has been progressed to improve a frequency efficiency (spectral efficiency) based on communication schemes such as an orthogonal frequency division multiple access (OFDMA) scheme, a MIMO scheme, and/or the like in order to increase a data rate.

In particular, a demand for data traffic has been accelerated according to an increase of a demand for a smart phone and a tablet PC and an explosive increase of applications which require large amounts of traffic according to this. So, it is difficult to satisfy a demand for wireless data traffic which is rapidly increased only by communication schemes for improving a frequency efficiency.

So, there is a growing interest in a wireless communication system which uses a super high frequency band to solve an explosive increase in this demand for wireless data traffic. However, in a case of communicating using the super high frequency band, a propagation loss such as a path loss, a reflection loss, and/or the like is increased due to a frequency characteristic of the super high frequency band, and a service coverage may be decreased since a range of a propagation shortens. So, the wireless communication system which uses the super high frequency band may expand a service coverage by mitigating a propagation loss of a propagation using a beam forming scheme to increase a range of a propagation.

Meanwhile, for supporting the beam forming scheme, there are a digital beam forming scheme through a plurality of radio frequency (RF) paths using a MIMO processing in a digital domain and a pre-coder or codebook (or will be referred to as a transmit pre-inverse fast Fourier transform (Tx pre-IFFT)/receive post-fast Fourier transform (Rx post-FFT) scheme) and an analog beam forming scheme using a plurality of analog/RF elements (e.g., a phase shifter, a power amplifier (PA), a variable gain amplifier (VGA), and an antenna structure) (or will be referred to as a Tx post-IFFT beam forming/Rx pre-FFT beam forming scheme).

In the digital beam forming scheme, for increasing a beam forming gain, an expensive digital to analog converter (DAC) and analog to digital converter (ADC) may be used and complexity of implementation may be increased.

Further, in the analog beam foil ling scheme, a limitation may occur in an aspect of effectively operating frequency resource or maximizing a beam forming performance when operating beam forming.

So, a hybrid beam forming scheme in which the digital beam forming scheme and the analog beam forming scheme are combined has been proposed for effectively operating a beam.

Meanwhile, a general millimeter wave (mm-wave) cellular system has used the analog beam forming scheme for preventing a phenomenon that a signal to noise ratio (SNR) of a received signal is degraded due to a high path-loss characteristic. In the analog beam forming scheme, a signal transmitting apparatus forms a directional beam pattern, designs an analog beam through a closed-loop beam training process which selects an optimal beam based on feedback information from a signal receiving apparatus, and various analog beam designing schemes have been proposed.

In particular, a standard such as an institute of electrical and electronics engineers (IEEE) 802.11ad standard, an IEEE 802.15.3c standard, and/or the like have proposed a scheme of selecting an analog beam based on a process which sequentially steers a wide beam (or a sector beam) and a narrow beam without channel information.

As described above, the standard such as the IEEE 802.11ad standard, the IEEE 802.15.3c standard, and/or the like selects an optimal beam based on a beam training scheme of a closed-loop scheme including two processes in order to decrease training overhead. That is, the standard such as the IEEE 802.11ad standard, the IEEE 802.15.3c standard, and/or the like selects an optimal beam based on a process which sequentially steers a wide beam and a narrow beam.

In the steering process, a wide sector beam used in a beam training initial process may not normally transfer a training signal in an outdoor environment unlike an indoor environment, so it may be undesirable to apply an analog beam selection scheme proposed in the standard such as the IEEE 802.11ad standard, the IEEE 802.15.3c standard, and/or the like to an mm-wave cellular system.

Further, an object of operating a beam in the standard such as the IEEE 802.11ad standard, the IEEE 802.15.3c standard, and/or the like is to effectively form a beam link focused on selecting an optimal beam. So, the analog beam selection scheme specifies a scheme of designing or selecting only an analog beam without channel information, so the analog beam selection scheme does not guarantee an optimal transmission performance considering an actual channel environment.

Meanwhile, a hybrid MIMO scheme using an analog beam and a digital MIMO scheme has proposed a scheme of selecting an analog beam, estimating an effective channel formed by the selected analog beam, and then designing a digital MIMO scheme.

However, the analog beam selection scheme proposed in the hybrid MIMO scheme selects an analog beam without estimating a channel for each of antennas supported in the hybrid MIMO scheme in order to decrease overhead due to channel estimation, so the analog beam selection scheme proposed in the hybrid MIMO scheme does not guarantee an optimal transmission performance considering an actual channel environment like analog beam selection scheme proposed in the standard such as the IEEE 802.11ad standard, the IEEE 802.15.3c standard, and/or the like.

So, there is a need for a scheme of operating a beam by considering a channel status in a communication system supporting a hybrid MIMO scheme.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes a beam operating apparatus and method in a communication system supporting a hybrid MIMO scheme.

Further, an embodiment of the present disclosure proposes a beam operating apparatus and method for enhancing a transmission performance in a communication system supporting a hybrid MIMO scheme.

Further, an embodiment of the present disclosure proposes a beam operating apparatus and method for decreasing signaling overhead in a communication system supporting a hybrid MIMO scheme.

Further, an embodiment of the present disclosure proposes a beam operating apparatus and method for decreasing processing complexity in a communication system supporting a hybrid MIMO scheme.

Further, an embodiment of the present disclosure proposes an apparatus and method for operating a beam by considering an mm-wave cellular communication in a communication system supporting a hybrid MIMO scheme.

Further, an embodiment of the present disclosure proposes an apparatus and method for operating a beam based on channel status in a communication system supporting a hybrid MIMO scheme.

Further, an embodiment of the present disclosure proposes an apparatus and method for operating a beam based on a beam training process in a communication system supporting a hybrid MIMO scheme.

Further, an embodiment of the present disclosure proposes an apparatus and method for operating a beam based on a uplink sounding process in a communication system supporting a hybrid MIMO scheme.

In accordance with an aspect of the present disclosure, a method for operating a beam by a mobile station (MS) in a communication system supporting a hybrid multiple-input multiple-output (MIMO) scheme is provided. The method includes receiving information related to a number of beams to be used by a base station (BS) in a beam training process from the BS; receiving a downlink reference signal (RS) from the BS; performing a channel estimating process based on the downlink RS; and transmitting information related to a number of beams to be used by the MS to the BS after performing the channel estimating process.

In accordance with another aspect of the present disclosure, a method for operating a beam by a base station (BS) in a communication system supporting a hybrid multiple-input multiple-output (MIMO) scheme is provided. The method includes transmitting information related to a number of beams to be used by the BS in a beam training process to a mobile station (MS); transmitting a downlink reference signal (RS) to the MS; and receiving information related to a number of beams to be used by the MS from the MS.

In accordance with still another aspect of the present disclosure, a mobile station (MS) in a communication system supporting a hybrid multiple-input multiple-output (MIMO) scheme is provided. The MS includes a receiver for performing an operation of receiving information related to a number of beams to be used by a base station (BS) in a beam training process from the BS, and an operation of receiving a downlink reference signal (RS) from the BS; a controller for performing a channel estimating process based on the downlink RS; and a transmitter for performing an operation of transmitting information related to a number of beams to be used by the MS to the BS.

In accordance with still another aspect of the present disclosure, base station (BS) in a communication system supporting a hybrid multiple-input multiple-output (MIMO) scheme is provided. The BS includes a transmitter for performing an operation of transmitting information related to a number of beams to be used by the BS in a beam training process to a mobile station (MS) and an operation of transmitting a downlink reference signal (RS) to the MS; and a receiver for performing an operation of receiving information related to a number of beams to be used by the MS from the MS.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
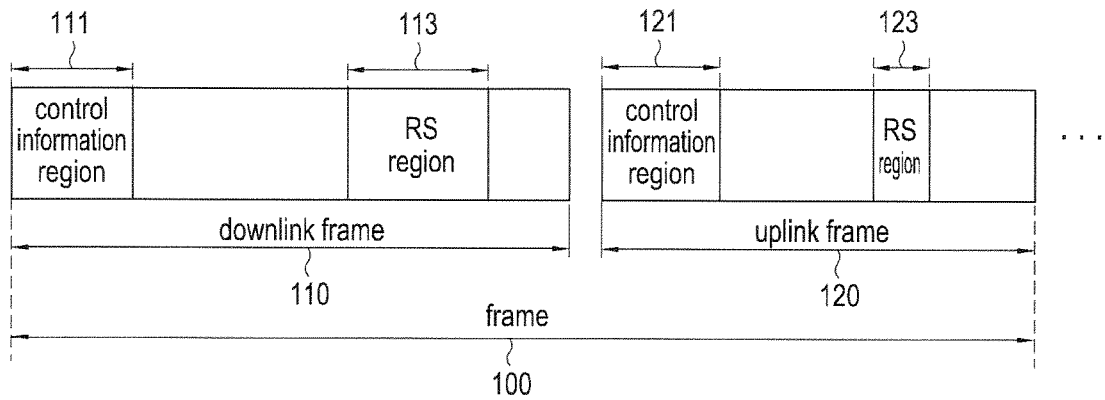
FIG. 1 schematically illustrates a frame structure in a communication system supporting a hybrid MIMO scheme according to an embodiment of the present disclosure.

The following detailed description, which refers to the accompanying drawings, will serve to provide a comprehensive understanding of the various embodiments of the present disclosure, which are defined by the claims and the equivalents of the claims. The following detailed description includes various specific details for the sake of understanding, but is to be construed as merely an example. Accordingly, those skilled in the art will recognize that various changes and modifications of the various embodiments described herein may be made without departing from the scope and spirit of this disclosure. Furthermore, the description of well-known functions and constructions may be omitted for clarity and conciseness.

The terms and words used in the following detailed description and claims are not intended to be limited in terms of language, but merely as being used to enable a clear and consistent understanding of the disclosure by the inventor. So, it should be clear that it is to be understood by those skilled in the art that the following detailed description of various embodiments of the disclosure is provided for illustrative purposes only and is not provided for limiting the present disclosure, as defined by the appended claims and equivalents of the claims.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

Further, in embodiments of the present disclosure, the terms used herein, including technical and scientific terms, have the same meanings as terms that are generally understood by those skilled in the art, as long as the terms are not differently defined. It should be analyzed that terms defined in a generally-used dictionary have meanings coinciding with those of terms in the related technology, and it is not analyzed that the terms have ideal or overly formal meanings, as long as the terms are clearly defined in an embodiment of the present disclosure.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a signal transmitting apparatus and a signal receiving apparatus may be, for example, a base station (BS). According to various embodiments of the present disclosure, the signal transmitting apparatus and the signal receiving apparatus may be, for example, a mobile station (MS).

An embodiment of the present disclosure proposes a beam operating apparatus and method in a communication system supporting a hybrid multiple-input multiple-output (MIMO) scheme.

Further, an embodiment of the present disclosure proposes a beam operating apparatus and method for enhancing a transmission performance in a communication system supporting a hybrid MIMO scheme.

Further, an embodiment of the present disclosure proposes a beam operating apparatus and method for decreasing signaling overhead in a communication system supporting a hybrid MIMO scheme.

Further, an embodiment of the present disclosure proposes a beam operating apparatus and method for decreasing processing complexity in a communication system supporting a hybrid MIMO scheme.

Further, an embodiment of the present disclosure proposes an apparatus and method for operating a beam by considering a millimeter wave (mm-wave) cellular communication in a communication system supporting a hybrid MIMO scheme.

Further, an embodiment of the present disclosure proposes an apparatus and method for operating a beam based on channel status in a communication system supporting a hybrid MIMO scheme.

Further, an embodiment of the present disclosure proposes an apparatus and method for operating a beam based on a beam training process in a communication system supporting a hybrid MIMO scheme.

Further, an embodiment of the present disclosure proposes an apparatus and method for operating a beam based on a uplink sounding process in a communication system supporting a hybrid MIMO scheme.

A method and apparatus proposed in an embodiment of the present disclosure may be applied to various communication systems such as an institute of electrical and electronics engineers (IEEE) 802.11ac communication system, an IEEE 802.16 communication system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, a mobile internet protocol (Mobile IP) system, and/or the like.

Firstly, an embodiment of the present disclosure proposes a new frame structure in order to operate a beam by considering an mm-wave cellular communication in a communication system supporting a hybrid MIMO scheme, and this will be described with reference to FIG. 1.

FIG. 1 schematically illustrates a frame structure in a communication system supporting a hybrid MIMO scheme according to an embodiment of the present disclosure.

Prior to a description of FIG. 1, an embodiment of the present disclosure assumes an mm-wave cellular communication environment and a time division duplex (TDD) environment where an angle of arrival (AoA) and an angle of departure (AoD) of a downlink channel are equal to an AoA and an AoD of a uplink channel. Further, a beam pattern and transmission power used in a BS for transmitting/receiving downlink control information and uplink control information are determined by considering a link budget of an MS located at an edge of a cell to which the BS provides a service. Further, it will be assumed that a beam width used in open-loop beam training for channel estimation, i.e., information on the number of beam patterns is determined among the BS and MSs to which the BS provides a service in advance. Alternatively, a BS and an MS may perform a process for determining a training beam width and the number of beam patterns before the MS performs a channel estimating operation.

Referring to FIG. 1, one frame 100 includes a downlink frame 110 and a uplink frame 120.

Firstly, the downlink frame 110 includes a control information region 111 and a reference signal (RS) region 113. Here, a region except for the control information region 111 and the RS region 113 in the downlink frame 110 is a data burst region in which downlink data is transmitted. Synchronization associated information, downlink operation information, and uplink resource allocation information are transmitted through the control information region 111. Here, the downlink control information may include various parameters, especially, information related to the number of beams which a BS will use for training. Here, it will be assumed that the number of beams which the BS will use for training is 'Nt'. Like this, in a case that the information related to the number of beams which the BS will use for the training is included in the downlink control information, an MS may exactly perform a channel estimating operation. Further, a downlink RS is transmitted through the RS region 113.

Next, the uplink frame 120 includes a control info illation region 121 and a uplink RS region 123. Here, a region except for the control information region 121 and the RS region 123 in the uplink frame 120 is a data burst region where uplink data is transmitted. Further, a uplink RS is transmitted through the RS region 123.

An operating process between a base station (BS) and a mobile station (MS) will be described based on the frame structure as described above.

Firstly, a BS notifies synchronization associated information, downlink operation information required for a downlink communication, and uplink resource allocation information for a uplink resource allocated to MSs. Here, the BS transmits the synchronization associated information, the downlink operation information, and the uplink resource allocation information through the control information region 111 included in the downlink frame 110. As described above, the downlink control information includes information related to the number of beams which the BS will use for training, so the MSs may exactly perform a channel estimating operation based on the information related to the number of beams which the BS will use for the training.

Thereafter, the BS transmits a downlink RS through beam training on the RS region 113 included in the downlink frame 110 such that MSs may perform a channel estimating operation. So, the MSs perform a channel estimating operation using the downlink RS.

Meanwhile, MSs which have completed the channel estimating operation report uplink operation information which is generated based on a channel estimation result thereof to the BS. At this time, the MSs report the uplink operation information to the BS through the control information area 121 included in the uplink frame 120. Here, the uplink operation information may include various parameters, especially, information related to the number of beam patterns which a corresponding MS will actually use. Here, it will be assumed that the number of beam patterns which an MS will actually use is 'N', and the number N of beam patterns which the MS will actually use is less than the number Nr of beam patterns available to the MS (N<Nr).

So, the MS performs a uplink sounding operation through a training process for N beam patterns, that is, the MS transmits a uplink RS signal.

A frame structure in a communication system supporting a hybrid MIMO scheme according to an embodiment of the present disclosure has been described with reference to FIG. 1, and a beam training process in a communication system supporting a hybrid MIMO scheme according to an embodiment of the present disclosure will be described with reference to FIG. 2.

Figure 2:
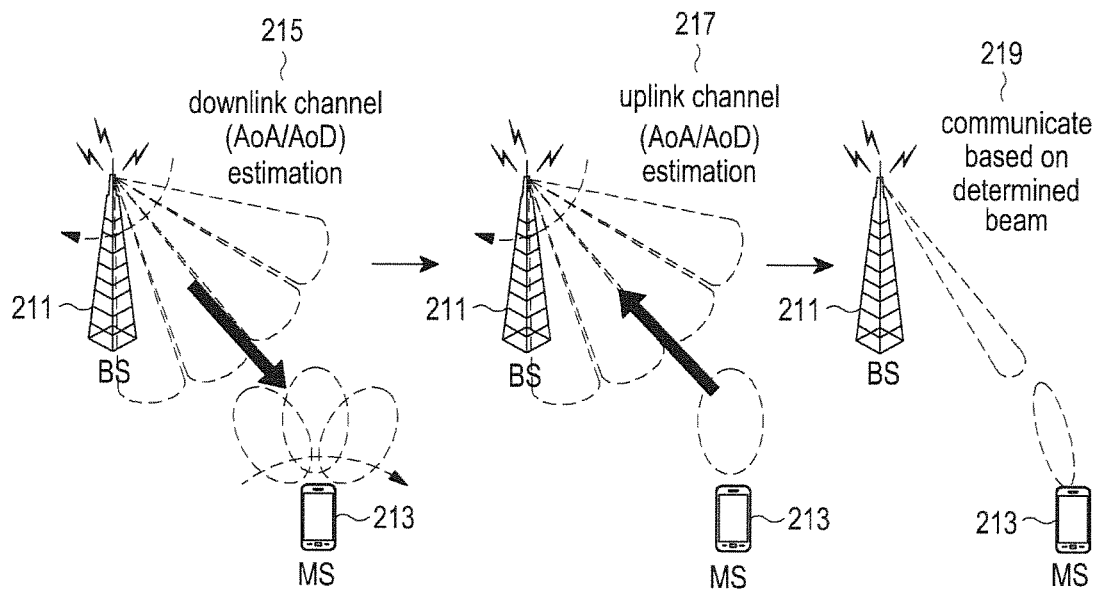
FIG. 2 schematically illustrates a beam training process in a communication system supporting a hybrid MIMO scheme according to an embodiment of the present disclosure.

FIG. 2 schematically illustrates a beam training process in a communication system supporting a hybrid MIMO scheme according to an embodiment of the present disclosure.

Prior to a description of FIG. 2, an existing beam training process used in a communication system supporting a general hybrid MIMO scheme, e.g., a communication system supporting an IEEE 802.11ad standard and an IEEE 802.15.3c standard will be described below.

Firstly, an existing beam training process is two-stage process, and includes a sector level-training process and a beam level-training process. Here, the sector level-training process is referred to as sector level sweep (SLS) process, and the beam level-training process is referred to as beam refinement protocol (BRP) process. Here, a detailed description for the sector level-training process and the beam level-training process included in the existing beam training process will be omitted.

Meanwhile, a beam training process proposed in an embodiment of the present disclosure is implemented as an one-stage process, i.e., a coarse beam sweeping process unlike an existing beam training process, and this will be described with reference to FIG. 2.

Firstly, the communication system includes a BS 211 and an MS 213.

The MS 213 estimates a channel transmitted by the BS 211, e.g., an AoA and an AoD through open-loop beam training which uses a coarse beam at step 215. Then, the BS 211 estimates a channel transmitted by the MS 213, e.g., an AoA and an AoD through open-loop beam training which uses a coarse beam at step 217. Thereafter, each of the BS 211 and the MS 213 determines a beam based on the channel estimation result, and communicates corresponding to the determined beam at step 219.

As described in FIG. 2, a beam training process proposed in an embodiment of the present disclosure may decrease overhead compared to an existing beam training process. That is, a beam training process proposed in an embodiment of the present disclosure may effectively estimate a channel, e.g., an AoA and an AoD using an algorithm which is based on a compressed sensing scheme by considering a characteristic that signal processing of a signal receiving apparatus is angular sparse.

A beam training process in a communication system supporting a hybrid MIMO scheme according to an embodiment of the present disclosure has been described with reference to FIG. 2, and a uplink sounding process in a communication system supporting a hybrid MIMO scheme according to an embodiment of the present disclosure will be described with reference to FIG. 3.

Figure 3:
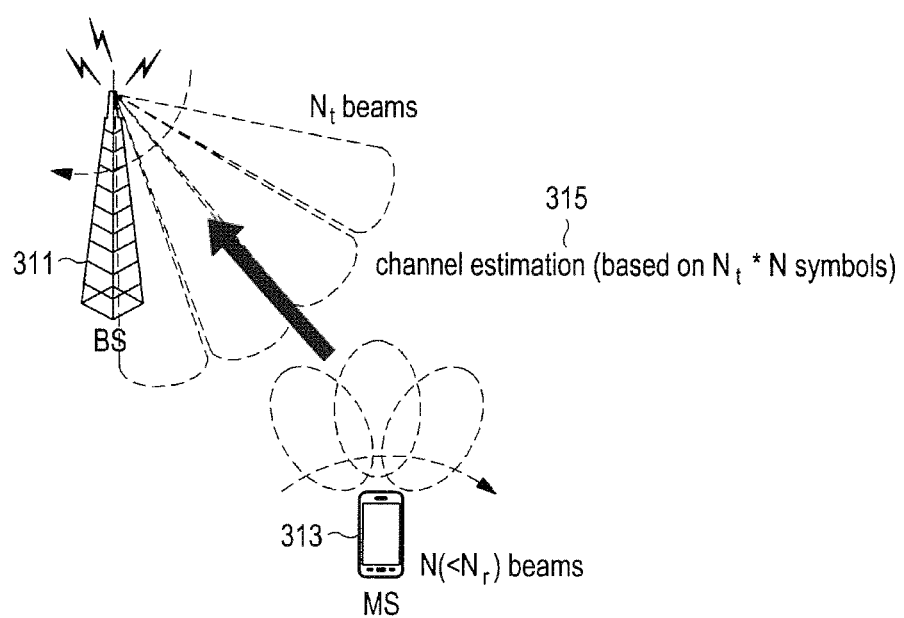
FIG. 3 schematically illustrates a uplink sounding process in a communication system supporting a hybrid MIMO scheme according to an embodiment of the present disclosure.

FIG. 3 schematically illustrates a uplink sounding process in a communication system supporting a hybrid MIMO scheme according to an embodiment of the present disclosure.

Prior to a description of FIG. 3, an existing uplink sounding process used in a communication system supporting a general hybrid MIMO scheme, e.g., a communication system supporting an IEEE 802.11ad standard and an IEEE 802.15.3c standard will be described below.

Firstly, a corresponding MS needs to transmit a sounding signal, i.e., an RS signal to a BS through a preset number of symbols, i.e., Nt*Nr symbols in order for the BS to acquire channel information for a uplink of the corresponding MS. Here, the preset number is acquired by the number Nr of beam patterns available to the corresponding MS and the number of Nt of beam patterns available to the BS. That is, in an existing uplink sounding process, a channel may be estimated by sweeping all beam patterns available to each of a BS and an MS.

However, in a uplink sounding process proposed in an embodiment of the present disclosure, an MS selects N beam patterns to be actually used from among Nr usable beam patterns, and transmits, to a BS, a sounding signal, i.e., an RS signal by considering the N beam patterns and Nt beam patterns usable in the BS. That is, the MS transmits a sounding signal, i.e., an RS signal to the BS through Nt*N(<Nr) symbols, and this will be described with reference to FIG. 3.

Firstly, the communication system includes a BS 311 and an MS 313.

Referring to FIG. 3, in a uplink sounding process proposed in an embodiment of the present disclosure, each of the BS 311 and the MS 313 does not estimate a channel by sweeping all usable beam patterns like in an existing uplink sounding process, and a channel is estimated by sweeping beam patterns usable in the BS 311 and beam patterns to be actually used in the MS 314 at step 315.

So, in an uplink sounding process proposed in an embodiment of the present disclosure, the MS 313 transmits, to the BS 311, the number N of beam patterns to be actually used as uplink control information. That is, the MS 313 notifies, to the BS 311, the number of beam patterns which the MS 313 will actually use through a control information region included in a uplink frame.

Further, in an uplink sounding process proposed in an embodiment of the present disclosure, the MS 311 may transmit, to the BS 311, the number of beam patterns to be actually used through an existing channel or the MS 311 may implicitly transmit, to the BS 311, the number of beam patterns to be actually used through a separate sequence for backward compatibility with an existing uplink sounding process. Here, the process of implicitly transmitting, to the BS 311, the number of beam patterns to be actually used will be described below.

Firstly, the BS 311 and the MS 313 promise in advance that a sequence A is a sequence indicating that the MS 313 continuously performs a beam training process and a sequence B is a sequence indicating that the MS 313 terminates a beam training process. So, the BS 311 detects that the MS 313 continuously performs the beam training process if a sequence A is received from the MS 313. Alternatively, the BS 311 may detect that the MS 313 terminates the beam training process if a sequence B is received from the MS 313. So, in this case, the BS 311 may detect the number N of beam patterns which the MS 313 will actually use even though the MS 313 does not explicitly transmit the number N of beam patterns which the MS 313 will actually use to the BS 311.

Alternatively, the MS 313 may transmit the number n of beam patterns which the MS 313 will actually use using a beam pattern which is optimal for a uplink resource allocated from the BS 311.

Meanwhile, the MS 313 may detect the number N of beam patterns which the MS 313 will actually use based on received signal strength, e.g., received signal code power (RSCP), reference signal received power (RSRP), a reference signal strength indicator (RSSI), reference signal received quality (RSRQ), a carrier-to-interference noise ratio (CINR), a signal-to-noise ratio (SNR), and a block error rate (BLER), or a channel estimation result. Here, if the MS 313 detects the number N of beam patterns which the MS 313 will actually use based on a channel estimation result, the MS 313 may fine tunes a transmission beam used in a case of transmitting a sounding signal based on a channel estimation result, e.g., an AoA.

Further, in an uplink sounding process proposed in an embodiment of the present disclosure, the number of beam patterns which the MS 313 will actually use is used, but the number of rays of a channel or the number of digital paths of the MS 313 may be used instead of the number of beam patterns which the MS 313 will actually use.

As described above, in a case that a uplink sounding process proposed in an embodiment of the present disclosure is used, power consumption used in a beam training process may be decreased and uplink resource consumption may be decreased compared to a case that an existing uplink sounding process is used.

Meanwhile, if beam patterns which an MS uses for a downlink are different from beam patterns which the MS uses for a uplink, it may be difficult to detect the number N of beam patterns which the MS will actually use based on received signal strength.

So, an embodiment of the present disclosure proposes a downlink channel estimating process for estimating a downlink channel, and this will be described below.

Firstly, a BS transmits an RS for channel estimation for $N_T^{Beam}$ beam patterns, and an MS receives the RS transmitted by the BS based on $N_R^{Beam}$ beam patterns. Here, each of the BS and the MS supports a MIMO scheme, and each of the BS and the MS includes $N_{RF}$ radio frequency (RF) chains thereby processing $N_{RF}$ signals at the same time. So, the number of received signals processed for one transmission beam pattern is $N_R^{Block}(=N_R^{Beam}/N_{RF})$.

Detailed describing this, an MS receives $N_T^{Block}$ signals using $N_{RF}$ beam patterns at the same time while a BS transmits a signal sequentially using $N_T^{Beam}$ beam patterns. That is, the MS receives $N_R^{Beam} \times N_T^{Beam}$ signals through total $N_T^{Beam} \times N_R^{Block}$ beam sweeping operations. So, the MS may acquire a channel H through a processing which is based on a compressed sensing scheme from a received signal Y. Here, the received signal Y is an $N_R^{Beam} \times N_T^{Beam}$ matrix and the channel H is an $N_R \times N_T$ matrix.

A downlink channel estimating process in a communication system supporting a hybrid MIMO scheme according to an embodiment of the present disclosure will be described with reference to FIG. 4.

Figure 4:
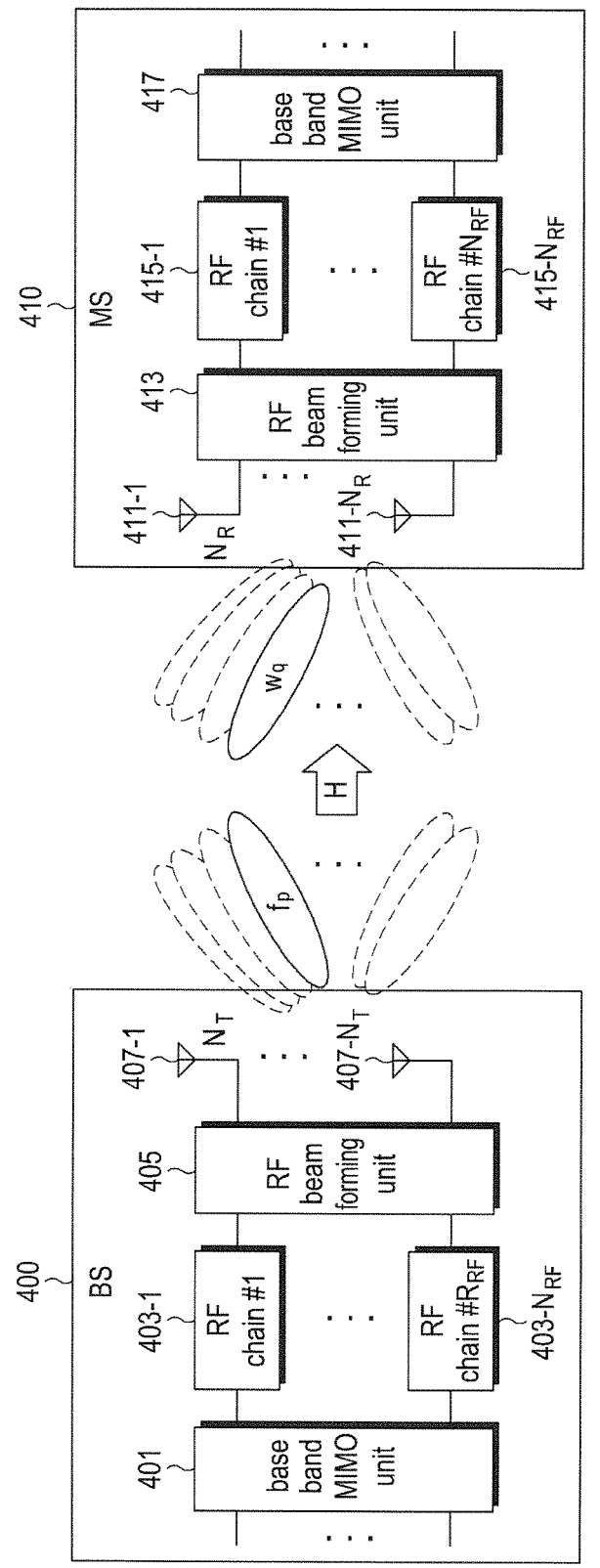
FIG. 4 schematically illustrates a downlink channel estimating process in a communication system supporting a hybrid MIMO scheme according to an embodiment of the present disclosure.

FIG. 4 schematically illustrates a downlink channel estimating process in a communication system supporting a hybrid MIMO scheme according to an embodiment of the present disclosure.

Referring to FIG. 4, the communication system includes a BS 400 and an MS 410.

The BS 400 includes a base band MIMO unit 401, a plurality of RF chains, e.g., $N_{RF}$ RF chains, i.e., an RF chain #1 403-1, . . . , an RF chain #$N_{RF}$ 403-$N_{RF}$, an RF beam forming unit 405, a plurality of antennas, e.g., $N_T$ antennas, i.e., an antenna #1 407-1, . . . , an antenna #$N_T$ 407-$N_T$.

Further, the MS 410 includes a plurality of antennas, e.g., $N_R$ antennas, i.e., an antenna #1 411-1, . . . , an antenna #$N_R$ 411-$N_R$, an RF beam forming unit 413, a plurality of RF chains, e.g., $N_{RF}$ RF chains, i.e., an RF chain #1 415-1, . . . , an RF chain #$N_{RF}$ 415-$N_{RF}$, and a base band MIMO unit 417.

Firstly, a frequency characteristic for an mm-wave communication is different from a frequency characteristic for a general cellular communication, so a channel model which reflects a propagation characteristic is also differently designed in a downlink channel estimating process proposed in an embodiment of the present disclosure.

A downlink channel estimating process proposed in an embodiment of the present disclosure considers a parametric channel model, so a channel H between a signal transmitting apparatus, i.e., the BS 400 and a signal receiving apparatus, i.e., the MS 410 may be expressed as Equation 1.

$$H = \sqrt{\frac{N_T N_R}{L}} \sum_{l=1}^{L} \alpha_l a_r(\theta_l^r) a_t^H(\theta_l^t) \quad \text{Equation 1}$$

In Equation 1, $N_T$ denotes the number of antennas included in a signal transmitting apparatus, $N_R$ denotes the number of antennas included in a signal receiving apparatus, L denotes the number of scatters, $\alpha_l$ denotes a channel gain, $\Theta_l^r/\Theta_l^t$ denotes an AoA/AoD, $a_r(\cdot)$ denotes an array response vector of the signal receiving apparatus, and $a_t(\cdot)$ denotes an array response vector of the signal transmitting apparatus.

If the channel H as expressed in Equation 1 is expressed as a matrix form, the channel H may be expressed as Equation 2.

$$H = A_R H_a A_T^H \quad \text{Equation 2}$$

As expressed in Equation 2, an mm-wave channel may be expressed as some AoAs/AoDs and a channel gain thereof.

So, a received signal received by the MS 410 may be expressed as Equation 3, Equation 4, and Equation 5.

Firstly, a response of the qth reception beam group for the pth transmission beam may be expressed as Equation 3.

$$y_{q,p} = \sqrt{P} W_q^H H f_p + W_q^H n_{q,p} \quad \text{Equation 3}$$

Secondly, a response of all reception beam groups for the pth transmission beam may be expressed as Equation 4.

$$y_p = \sqrt{P} W^H H f_p + \text{diag}(W_1^H, \ldots, W_{N_R^{Block}}^H) \\ [n_{1,p}^T, \ldots, n_{N_R^{Block},p}^T]^T \quad \text{Equation 4}$$

Lastly, a total response of all transmission beams and all reception beams may be expressed as Equation 5.

$$Y = \sqrt{P} W^H H F + N \quad \text{Equation 5}$$

In Equation 5, $Y = [y_1, \ldots, y_{N_T^{Beam}}] \in \mathbb{C}^{N_R^{Beam} \times N_T^{Beam}}$, $W = [W_1, \ldots, W_{N_R^{Block}}] \in \mathbb{C}^{N_R \times N_R^{Beam}}$, and $F = [f_1, \ldots, f_{N_T^{Beam}}] \in \mathbb{C}^{N_T \times N_T^{Beam}}$.

A downlink channel estimating process proposed in an embodiment of the present disclosure uses a compressed sensing scheme by considering a characteristic that an mm-wave channel is angular sparse.

Before using the compressed sensing scheme, it will be assumed that a channel is configured as an arbitrary discrete angle (grid) and an equation for a beam response will be changed by considering a sparse estimation aspect. So, if a channel is expressed with G(>>L) grids, the channel may be expressed as Equation 6.

$$H \approx \bar{A}_R \bar{H}_a \bar{A}_T^H \quad \text{Equation 6}$$

In Equation 6, $\bar{H}_a \in \mathbb{C}^{G \times G}$, $\bar{A}_R = [a_r(\varphi_1), \ldots, a_r(\varphi_g), \ldots, a_r(\varphi_G)] \in \mathbb{C}^{N_R \times G}$, $\bar{A}_T = [a_t(\varphi_1), \ldots, a_t(\varphi_g), \ldots, a_t(\varphi_G)] \in \mathbb{C}^{N_T \times G}$.

Using the assumed channel grid and mathematical manipulation such a vectorizing operation, a received signal may be expressed as Equation 7.

$$\bar{y} = \sqrt{P} ((F_{RF} F_{BB})^T \otimes W_{BB}^H W_{RF}^H) \cdot vec(H) + \bar{n} \quad \text{Equation 7}$$
$$= \sqrt{P} ((F_{RF} F_{BB})^T \otimes W_{BB}^H W_{RF}^H)(\bar{A}_T^* \otimes \bar{A}_R) \cdot vec(\bar{H}_a) + \bar{n}$$
$$= \sqrt{P} (\bar{A}_T^H F_{RF} F_{BB})^T \otimes W_{BB}^H W_{RF}^H \bar{A}_R) \cdot vec(\bar{H}_a) + \bar{n}$$
$$= \bar{Q} \cdot vec(\bar{H}_a) + \bar{n}$$

So, a channel estimation result may be expressed as Equation 8.

$$vec(\bar{H}_a) = \arg \min_{\bar{H}_a} \|\bar{y} - \bar{Q} \cdot vec(\bar{H}_a)\|_2 \text{ s.t. } \|vec(\bar{H}_a)\|_0 \quad \text{Equation 8}$$
$$= L$$

So, the MS 401 performs a downlink channel estimating process, and then determines the number of AoAs detected according to the result of the downlink channel estimating process as N.

A downlink channel estimating process in a communication system supporting a hybrid MIMO scheme according to an embodiment of the present disclosure has been described with reference to FIG. 4, and an operating process of a BS in a communication system supporting a hybrid MIMO scheme according to an embodiment of the present disclosure will be described with reference to FIG. 5.

Figure 5:
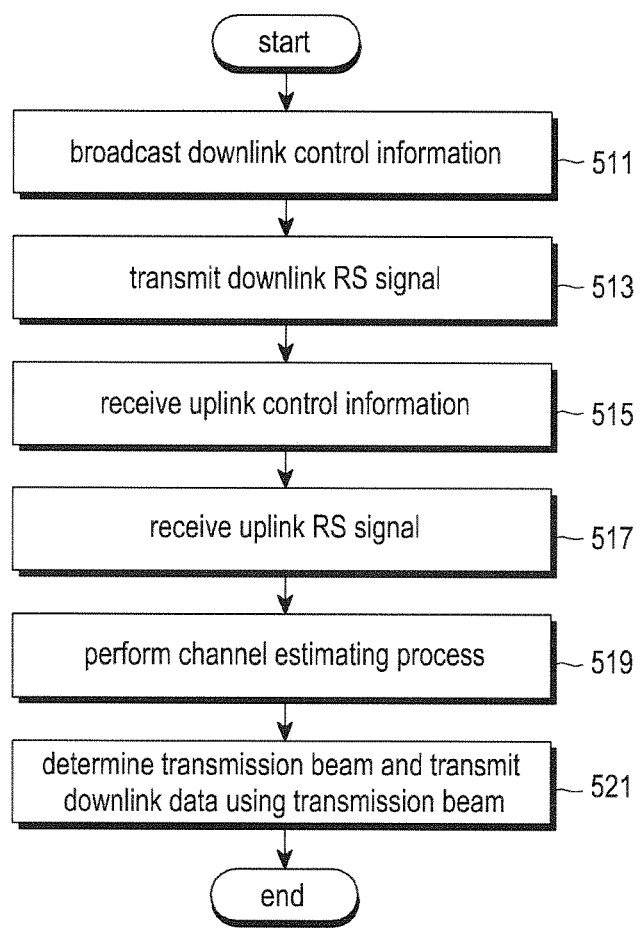
FIG. 5 schematically illustrates an operating process of a BS in a communication system supporting a hybrid MIMO scheme according to an embodiment of the present disclosure.

FIG. 5 schematically illustrates an operating process of a BS in a communication system supporting a hybrid MIMO scheme according to an embodiment of the present disclosure.

Referring to FIG. 5, a BS broadcasts downlink control information at step 511, and proceeds to step 513. Here, the downlink control information is broadcasted through a control information region included in a downlink frame. The BS transmits an RS signal at step 513 and proceeds to step 515. Here, the RS signal is transmitted through an RS region included in the downlink frame, and the BS transmits the RS signal based on a coarse beam sweeping process.

The BS receives uplink control information from an MS at step 515, and proceeds to step 517. Here, the uplink control information is received through a control information region included in a uplink frame. The BS receives an RS from the MS at step 517, and proceeds to step 519. Here, the RS signal is received through an RS region included in the uplink frame, and the BS receives the RS signal based on a coarse beam sweeping process.

The BS performs a channel estimating process for a uplink channel at step 519, and proceeds to step 521. Here, the channel estimating process has been described above, so a detailed description thereof will be omitted herein. The BS determines a transmission beam based on a channel estimation result acquired through the channel estimating process, and transmits downlink data using the determined transmission beam at step 521.

Although FIG. 5 illustrates an operating process of a BS in a communication system supporting a hybrid MIMO scheme according to an embodiment of the present disclosure, various changes could be made to FIG. 5. For example, although shown as a series of operations, various operations in FIG. 5 could overlap, occur in parallel, occur in a different order, or occur multiple times.

An operating process of a BS in a communication system supporting a hybrid MIMO scheme according to an embodiment of the present disclosure has been described with reference to FIG. 5, and an operating process of an MS in a communication system supporting a hybrid MIMO scheme according to an embodiment of the present disclosure will be described with reference to FIG. 6.

Figure 6:
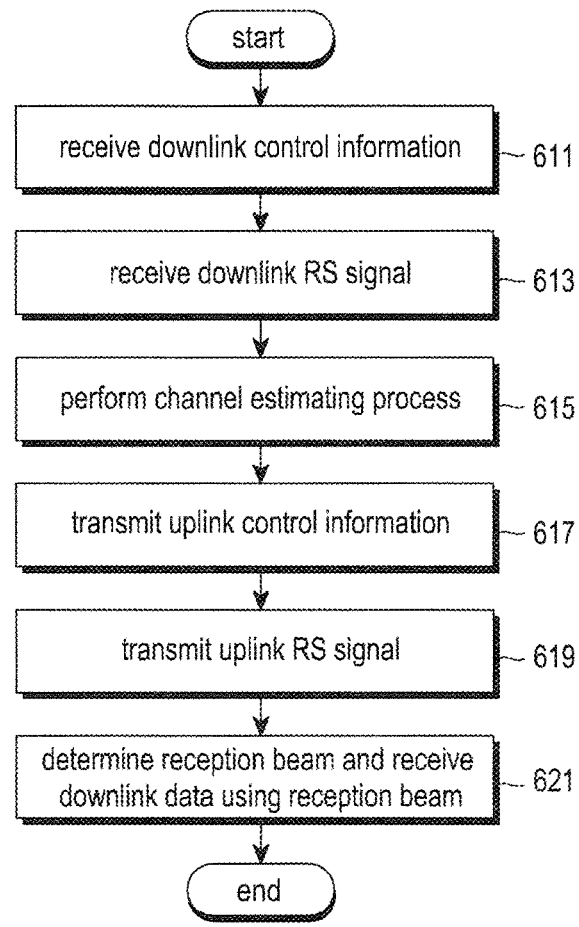
FIG. 6 schematically illustrates an operating process of an MS in a communication system supporting a hybrid MIMO scheme according to an embodiment of the present disclosure.

FIG. 6 schematically illustrates an operating process of an MS in a communication system supporting a hybrid MIMO scheme according to an embodiment of the present disclosure.

Referring to FIG. 6, an MS receives downlink control information broadcasted from a BS at step 611, and proceeds to step 613. Here, the downlink control information is broadcasted through a control information region included in a downlink frame. The MS receives an RS signal from the BS at step 613 and proceeds to step 615. Here, the RS signal is transmitted through an RS region included in the downlink frame, and the MS receives the RS signal based on a coarse beam sweeping process.

The MS performs a channel estimating process for a downlink channel at step 615, and proceeds to step 617. Here, the channel estimating process has been described above, so a detailed description thereof will be omitted herein. The MS determines a transmission beam based on a channel estimation result according to the channel estimating process, and transmits uplink control information to the BS using the determined transmission beam at step 617, and proceeds to step 619. Here, the uplink control information is transmitted through a control information region included in a uplink frame, and the uplink control information includes the number N of beam patterns which the MS will actually use.

The MS transmits an RS signal to the BS at step 619, and proceeds to step 621. Here, the RS signal is transmitted through an RS region included in the uplink frame, and the MS transmits the RS signal based on a coarse beam sweeping process. The MS performs a channel estimating process based on the downlink data received from the BS, determines a reception beam pattern based on a channel estimation result acquired through the channel estimating process, and receives downlink data based on the reception beam pattern.

Although FIG. 6 illustrates an operating process of an MS in a communication system supporting a hybrid MIMO scheme according to an embodiment of the present disclosure, various changes could be made to FIG. 6. For example, although shown as a series of operations, various operations in FIG. 6 could overlap, occur in parallel, occur in a different order, or occur multiple times.

An operating process of an MS in a communication system supporting a hybrid MIMO scheme according to an embodiment of the present disclosure has been described with reference to FIG. 6, and an example of an inner structure of a BS in a communication system supporting a hybrid MIMO scheme according to an embodiment of the present disclosure will be described with reference to FIG. 7.

Figure 7:
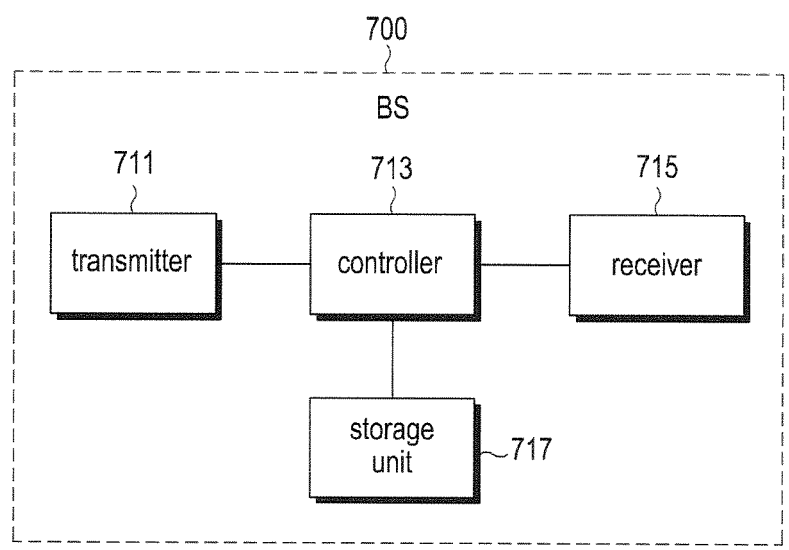
FIG. 7 schematically illustrates an example of an inner structure of a BS in a communication system supporting a hybrid MIMO scheme according to an embodiment of the present disclosure.

FIG. 7 schematically illustrates an example of an inner structure of a BS in a communication system supporting a hybrid MIMO scheme according to an embodiment of the present disclosure.

Referring to FIG. 7, a BS 700 includes a transmitter 711, a controller 713, a receiver 715, and a storage unit 717.

The controller 713 controls an overall operation of the BS 700. The controller 713 controls the BS 700 to perform an overall operation related to a beam operating operation including a beam training process, a uplink sounding process, a downlink channel estimating process, and/or the like. Here, an overall operation related to a beam operating operation including a beam training process, a uplink sounding process, a downlink channel estimating process, and/or the like according to an embodiment of the present disclosure has been described with FIGS. 1 to 5, and a detailed description thereof will be omitted herein.

The transmitter 711 transmits various signals, various messages, and/or the like to an MS and/or the like under a control of the controller 713. The various signals, the various messages, and/or the like transmitted in the transmitter 711 have been described with reference to FIGS. 1 to 5, and a detailed description thereof will be omitted herein.

The receiver 715 receives various signals, various messages, and/or the like from the MS and/or the like under a control of the controller 713. The various signals, the various messages, and/or the like received in the receiver 715 have been described with reference to FIGS. 1 to 5, and a detailed description thereof will be omitted herein.

The storage unit 717 stores a program, various data, and/or the like required for an operation of the BS 700, and more particular, information related to an overall operation related to a beam operating operation including a beam training process, a uplink sounding process, a downlink channel estimating process, and/or the like according to an embodiment of the present disclosure, and/or the like. The storage unit 717 stores various signals and various messages which are received by the receiver 715 from the MS and/or the like.

While the transmitter 711, the controller 713, the receiver 715, and the storage unit 717 are described in the BS 700 as separate units in FIG. 7, however, the BS 700 may be implemented as a form that at least two of the transmitter 711, the controller 713, the receiver 715, and the storage unit 717 are incorporated into a single unit.

An example of an inner structure of a BS in a communication system supporting a hybrid MIMO scheme according to an embodiment of the present disclosure has been described with reference to FIG. 7, and another example of an inner structure of a BS in a communication system supporting a hybrid MIMO scheme according to an embodiment of the present disclosure will be described with reference to FIG. 8.

Figure 8:
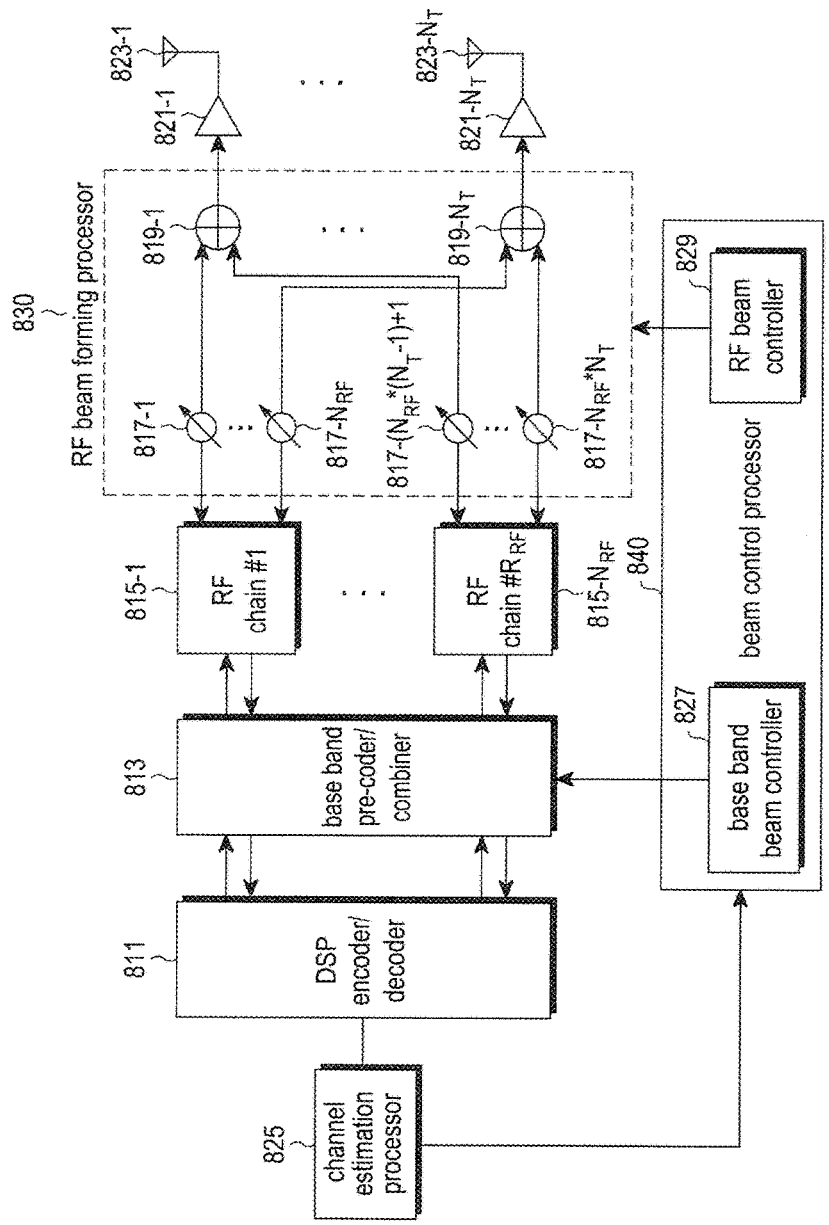
FIG. 8 schematically illustrates another example of an inner structure of a BS in a communication system supporting a hybrid MIMO scheme according to an embodiment of the present disclosure.

FIG. 8 schematically illustrates another example of an inner structure of a BS in a communication system supporting a hybrid MIMO scheme according to an embodiment of the present disclosure.

Referring to FIG. 8, a BS 800 includes a digital signal processor (DSP) encoder/decoder 811, a base band pre-coder/combiner 813, a plurality of RF chains, e.g., $N_{RF}$ RF chains, i.e., an RF chain #1 815-1, . . . , an RF chain #$NR_F$ 815-$NR_F$, a plurality of phase shifters, e.g., $N_{RF}*N_T$ phase shifters, i.e., a phase shifter #1 817-1, . . . , a phase shifter #$N_{RF}*N_T$ 817-$N_{RF}*N_T$, a plurality of adders/dividers, e.g., $N_T$ adders/dividers, i.e., an adder/divider #1 819-1, . . . , an adder/divider #$N_T$ 819-$N_T$, a plurality of amplifiers, e.g., $N_T$ amplifiers, i.e., an amplifier #1 821-1, . . . , an amplifier #$N_T$ 821-$N_T$, a plurality of antennas, e.g., $N_T$ antennas, i.e., an antenna #1 823-1, . . . , an antenna #$N_T$ 823-$N_T$, a channel estimation processor 825, a base band beam controller 827, and an RF beam controller 829. Here, a processor including the phase shifter #1 817-1, . . . , the phase shifter #$N_{RF}*N_T$ 817-$N_{RF}*N_T$, the adder/divider #1 819-1, . . . , the adder/divider #$N_T$ 819-$N_T$ is an RF beam forming processor 830, and a processor including the base band beam controller 827 and the RF beam controller 829 is a beam control processor 840. Further, each of the amplifier #1 821-1, . . . , the amplifier #$N_T$ 821-$N_T$ may be implemented with, for example, a power amplifier (PA) or a low noise amplifier (LNA).

Firstly, a process in which the BS 800 transmits a signal will be described below.

When an information vector to be transmitted is input, the DSP encoder/decoder 811 encodes the information vector based on a preset encoding scheme to generate an encoded signal, and outputs the encoded signal to the base band pre-coder/combiner 813. The encoding scheme used in the DSP encoder/decoder 811 may be implemented with various forms, and a detailed description thereof will be omitted herein.

The base band pre-coder/combiner 813 pre-codes the encoded signal output from the DSP encoder/decoder 811 based on a preset pre-coding scheme to generate a pre-coded signal under a control of the base band beam controller 827, and outputs the pre-coded signal to each of the RF chain #1 815-1, . . . , the RF chain #$NR_F$ 815-$NR_F$. The base band beam controller 827 controls an operation of the base band pre-coder/combiner 813 corresponding to a transmission beam pattern, and a process of determining the transmission beam pattern has been describe above, so a detailed description thereof will be omitted herein. Further, the pre-coding scheme used in the base band pre-coder/combiner 813 may be implemented with various forms, and a detailed description thereof will be omitted herein.

Each of the RF chain #1 815-1, . . . , the RF chain #$NR_F$ 815-$NR_F$ RF processes the signal pre-coded in the base band pre-coder/combiner 813 based on a preset scheme to generate an RF processed signal, and outputs the RF processed signal to phase shifters connected to each of the RF chain #1 815-1, . . . , the RF chain #$NR_F$ 815-$NR_F$, i.e., the phase shifter #1 817-1, . . . , the phase shifter #$N_{RF}*N_T$ **817-$N_{RF}*N_T$. That is, the RF chain #1 815-1 outputs an RF processed signal generated in the RF chain #1 815-1 to phase shifters connected to each of the RF chain #1 815-1, i.e., a phase shifter #1 817-1 and a phase shifter #2 (not shown in FIG. 8). Like this, the RF chain #$NR_F$ 815-$NR_F$ as the last RF chain outputs an RF processed signal generated in the RF chain #$NR_F$ 815-$NR_F$ to phase shifters connected to each of the RF chain #$NR_F$ 815-$NR_F$**, i.e., a phase shifter #$N_{RF}*N_T$-1 (not shown in FIG. 8) and a phase shifter #$N_{RF}*N_T$ (**817-$N_{RF}*N_T$**).

Each of the phase shifter #1 817-1, . . . , the phase shifter #$N_{RF}*N_T$ **817-$N_{RF}*N_T$ phase shifts an RF processed signal output from a corresponding RF chain under a control of the RF beam controller 829 by a preset phase to generate a phase shifted signal, and outputs the phase shifted signal to each of the adder/divider #1 819-1, . . . , the adder/divider #$N_T$ 819-$N_T$. The RF beam controller 829 controls an operation of the phase shifter #1 817-1**, . . . , the phase shifter #$N_{RF}*N_T$ **817-$N_{RF}*N_T$** corresponding to the transmission beam pattern, and a process of determining the transmission beam pattern has been described above, so a detailed description thereof will be omitted herein.

Each of the adder/divider #1 819-1, . . . , the adder/divider #$N_T$ 819-$N_T$ adds a phase shifted signal output from each of phase shifter #1 817-1, . . . , the phase shifter #$N_{RF}*N_T$ **817-$N_{RF}*N_T$ to generate an added signal, and outputs the added signal to a corresponding amplifier. That is, the adder/divider #1 819-1 outputs an added signal generated in the adder/divider #1 819-1 to the amplifier #1 821-1. Like this, the adder/divider #$N_T$ 819-$N_T$ as the last adder/divider outputs an added signal generated in the adder/divider #$N_T$ 819-$N_T$ to the amplifier #$N_T$ 821-$N_T$**.

Each of the amplifier #1 821-1, . . . , amplifier #$N_T$ 821-$N_T$ amplifies an added signal output from an adder/divider connected to each of the amplifier #1 821-1, . . . , amplifier #$N_T$ 821-$N_T$ corresponding to a preset gain to generate an amplified signal, and transmits the amplified signal through an antenna connected to each of the amplifier #1 821-1, . . . , the amplifier #$N_T$ 821-$N_T$. That is, the amplifier #1 821-1 transmits an amplified signal generated in the amplifier #1 821-1 through the antenna #1 823-1. Like this, the amplifier #$N_T$ 821-$N_T$ transmits an amplified signal generated in the amplifier #$N_T$ 821-$N_T$ through the antenna #$N_T$ 823-$N_T$.

Secondly, a process in which the BS 800 receives a signal will be described below.

Firstly, a signal received through each of the antenna #1 823-1, . . . , the antenna #$N_T$ 823-$N_T$ is input to an amplifier connected to each of the antenna #1 823-1, . . . , the antenna #$N_T$ 823-$N_T$. That is, a signal received through the antenna #1 823-1 is input to the amplifier #1 821-1. Like this, a signal received through the antenna #$N_T$ 823-$N_T$ as the last antenna is input to the amplifier #$N_T$ 821-$N_T$.

Each of the amplifier #1 821-1, . . . , amplifier #$N_T$ 821-$N_T$ amplifies a received signal input from a corresponding antenna corresponding to a preset gain to generate an amplified signal, and outputs the amplified signal to an adder/divider connected to each of the amplifier #1 821-1, . . . , the amplifier #$N_T$ 821-$N_T$. That is, the amplifier #1 821-1 outputs an amplified signal generated in the amplifier #1 821-1 to the adder/divider #1 819-1. Like this, the amplifier #$N_T$ 821-$N_T$ as the last amplifier outputs an amplified signal generated in the amplifier #$N_T$ 821-$N_T$ to the adder/divider # $N_T$ 819-$N_T$.

Each of the adder/divider #1 819-1, . . . , the adder/divider #$N_T$ 819-$N_T$ outputs an amplified signal output from an amplifier connected to each of the adder/divider #1 819-1, . . . , the adder/divider #$N_T$ 819-$N_T$ to a corresponding phase shifter. That is, the adder/divider #1 819-1 outputs an amplified signal output from the amplifier #1 821-1 to the phase shifter #1 817-1, . . . , a phase shifter #$N_{RF}$ (not shown in FIG. 8). Like this, the adder/divider #$N_T$ 819-$N_T$ as the last adder/divider outputs an amplified signal output from the amplifier #$N_T$ 821-$N_T$ to a phase shifter #$N_{RF}*(N_T-1)$(not shown in FIG. 8), . . . , the phase shifter #$N_{RF}*N_T$ **817-$N_{RF}*N_T$**.

Each of the phase shifter #1 817-1, . . . , the phase shifter #$N_{RF}*N_T$ **817-$N_{RF}*N_T$ phase shifts a signal output from an adder/divider connected to each of the phase shifter #1 817-1**, . . . , the phase shifter #$N_{RF}*N_T$ **817-$N_{RF}*N_T$ by a preset phase under a control of the RF beam controller 829 to generate a phase shifted signal, and outputs the phase shifted signal to a corresponding RF chain. That is, each of the phase shifter #1 817-1**, . . . , the phase shifter #$N_{RF}*N_T$ **817-$N_{RF}*N_T$ outputs a phase shifted signal generated in each of the phase shifter #1 817-1**, . . . , the phase shifter #$N_{RF}*N_T$ **817-$N_{RF}*N_T$ to the RF chain #1 815-1**. Like this, each of the phase shifter #N ($N_T$-1), . . . , the phase shifter #$N_{RF}*N_T$ **817-$N_{RF}*N_T$** outputs a phase shifted signal generated in each of the phase shifter #$N_{RF}*(N_T-1)$, . . . , the phase shifter $N*N_T$ **817-$N_{RF}*N_T$ to the RF chain # $N_{RF}$ 815-$N_{RF}$. Further, the RF beam controller 829 controls an operation of the phase shifter #1 817-1**, . . . , the phase shifter #$N_{RF}*N_T$ **817-$N_{RF}*N_T$** corresponding to a reception beam pattern, and a process of determining the reception beam pattern has been described above, so a detailed description thereof will be omitted herein.

Each of the RF chain #1 815-1, . . . , the RF chain # $N_{RF}$ 815-$N_{RF}$ RF processes a phase shifted signal output from corresponding phase shifters by a preset scheme to generate an RF processed signal, and outputs the RF processed signal to the base band pre-coder/combiner 813. The base band pre-coder/combiner 813 combines a signal output from each of the RF chain #1 815-1, . . . , the RF chain # $N_{RF}$ 815-$N_{RF}$ based on a preset combination scheme under a control of the base band beam controller 827 to generate a combined signal, and outputs the combined signal to the DSP encoder/decoder 811. The base band beam controller 827 controls an operation of the base band pre-coder/combiner 813 corresponding the reception beam pattern, and a process of determining the reception beam pattern has been described above, so a detailed description thereof will be omitted herein. Further, the combination scheme used in the base band pre-coder/combiner 813 may be implemented with various forms, and a detailed description thereof will be omitted herein.

The DSP encoder/decoder 811 decodes a combined signal output from the base band pre-coder/combiner 813 based on a preset decoding scheme to generate a decoded signal, and outputs the decoded signal to the channel estimation processor 825. The decoding scheme used in the DSP encoder/decoder 811 may be implemented with various forms, and a detailed description thereof will be omitted herein.

The signal channel estimation processor 825 performs a channel estimating process based on the decoded signal output from the DSP encoder/decoder 811, and outputs a channel estimated result according to the channel estimating process to the beam control processor 840. The channel estimating process has been described above, so a detailed description thereof will be omitted herein.

While the DSP encoder/decoder 811, the base band pre-coder/combiner 813, the RF chain #1 815-1, ..., the RF chain #$N_{RF}$ 815-$N_{RF}$, the phase shifter #1 817-1, ..., the phase shifter #$N_{RF}*N_T$ 817-$N_{RF}*N_T$, the adder/divider #1 819-1, ..., the adder/divider #$N_T$ 819-$N_T$, the amplifier #1 821-1, ..., the amplifier #$N_T$ 821-$N_T$, the antenna #1 823-1, ..., the antenna #$N_T$ 823-$N_T$, the channel estimation processor 825, the base band beam controller 827, and the RF beam controller 829 are described in the BS 800 as separate units in FIG. 8, however, the BS 800 may be implemented as a form that at least two of the DSP encoder/decoder 811, the base band pre-coder/combiner 813, the RF chain #1 815-1, ..., the RF chain #$N_{RF}$ 815-$N_{RF}$, the phase shifter #1 817-1, ..., the phase shifter N*$N_T$ 817-$N_{RF}*N_T$, the adder/divider #1 819-1, ..., the adder/divider #$N_T$ 819-$N_T$, the amplifier #1 821-1, ..., the amplifier #$N_T$ 821-$N_T$, the antenna #1 823-1, ..., the antenna #$N_T$ 823-$N_T$, the channel estimation processor 825, the base band beam controller 827, and the RF beam controller 829 are incorporated into a single unit.

While the phase shifter #1 817-1, ..., the phase shifter #$N_{RF}*N_T$ 817-$N_{RF}*N_T$, the adder/divider #1 819-1, ..., the adder/divider #$N_T$ 819-$N_T$ are described in the RF beam forming processor 830 as separate units in FIG. 8, however, the RF beam forming processor 830 may be implemented as a form that at least two of the phase shifter #1 817-1, ..., the phase shifter #$N_{RF}*N_T$ 817-$N_{RF}*N_T$, the adder/divider #1 819-1, ..., the adder/divider #$N_T$ 819-$N_T$ are incorporated into a single unit.

While the base band beam controller 827 and the RF beam controller 829 are described in the beam control processor 840 as separate units in FIG. 8, however, the beam control processor 840 may be implemented as a form that the base band beam controller 827 and the RF beam controller 829 are incorporated into a single unit.

Another example of an inner structure of a BS in a communication system supporting a hybrid MIMO scheme according to an embodiment of the present disclosure has been described with reference to FIG. 8, and an example of an inner structure of an MS in a communication system supporting a hybrid MIMO scheme according to an embodiment of the present disclosure will be described with reference to FIG. 9.

Figure 9:
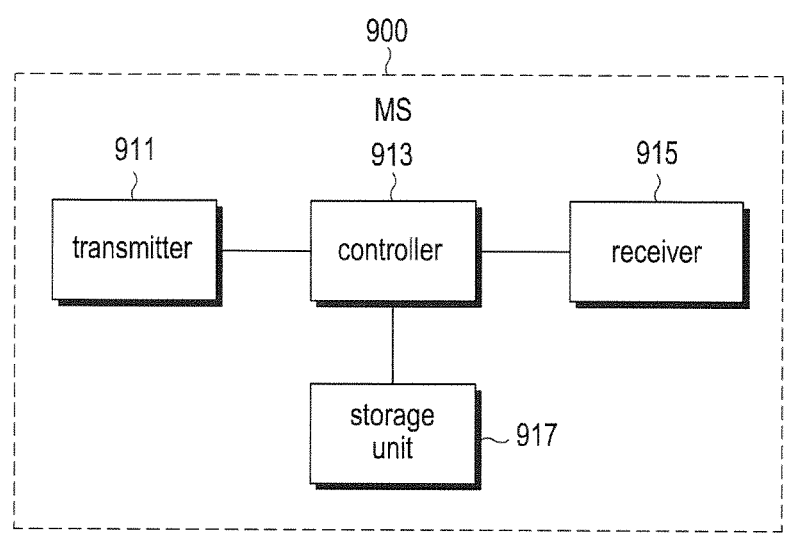
FIG. 9 schematically illustrates an example of an inner structure of an MS in a communication system supporting a hybrid MIMO scheme according to an embodiment of the present disclosure.

FIG. 9 schematically illustrates an example of an inner structure of an MS in a communication system supporting a hybrid MIMO scheme according to an embodiment of the present disclosure.

Referring to FIG. 9, an MS 900 includes a transmitter 911, a controller 913, a receiver 915, and a storage unit 917.

The controller 913 controls an overall operation of the MS 900. The controller 913 controls the MS 900 to perform an overall operation related to a beam operating operation including a beam training process, a uplink sounding process, a downlink channel estimating process, and/or the like. Here, an overall operation related to a beam operating operation including a beam training process, a uplink sounding process, a downlink channel estimating process, and/or the like according to an embodiment of the present disclosure has been described with FIGS. 1 to 6, and a detailed description thereof will be omitted herein.

The transmitter 911 transmits various signals, various messages, and/or the like to a BS and/or the like under a control of the controller 913. The various signals, the various messages, and/or the like transmitted in the transmitter 911 have been described with reference to FIGS. 1 to 6, and a detailed description thereof will be omitted herein.

The receiver 915 receives various signals, various messages, and/or the like from the BS and/or the like under a control of the controller 913. The various signals, the various messages, and/or the like received in the receiver 915 have been described with reference to FIGS. 1 to 6, and a detailed description thereof will be omitted herein.

The storage unit 917 stores a program, various data, and/or the like required for an operation of the MS 900, and more particular, information related to an overall operation related to a beam operating operation including a beam training process, a uplink sounding process, a downlink channel estimating process, and/or the like according to an embodiment of the present disclosure, and/or the like. The storage unit 917 stores various signals and various messages which are received by the receiver 915 from the BS and/or the like.

While the transmitter 911, the controller 913, the receiver 915, and the storage unit 917 are described in the MS 900 as separate units in FIG. 9, however, the MS 900 may be implemented as a form that at least two of the transmitter 911, the controller 913, the receiver 915, and the storage unit 917 are incorporated into a single unit.

An example of an inner structure of an MS in a communication system supporting a hybrid MIMO scheme according to an embodiment of the present disclosure has been described with reference to FIG. 9, and another example of an inner structure of an MS in a communication system supporting a hybrid MIMO scheme according to an embodiment of the present disclosure will be described with reference to FIG. 10.

Figure 10:
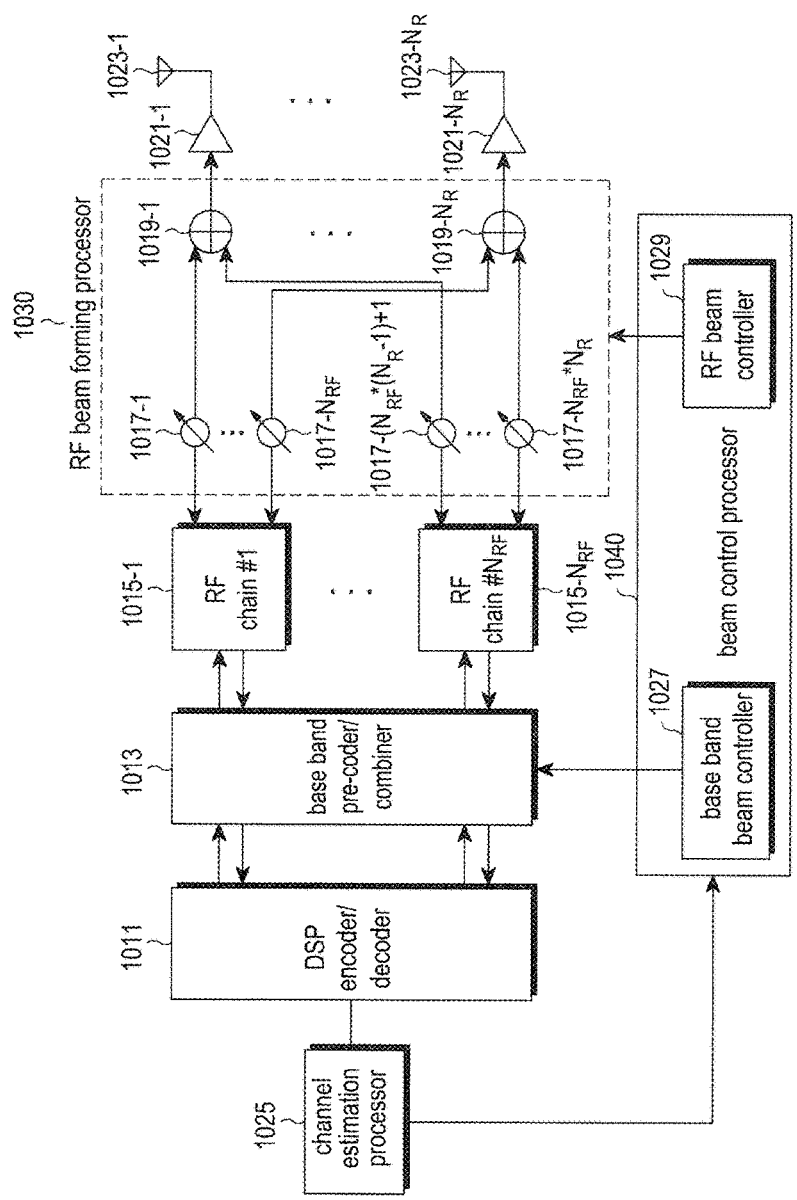
FIG. 10 schematically illustrates another example of an inner structure of an MS in a communication system supporting a hybrid MIMO scheme according to an embodiment of the present disclosure.

FIG. 10 schematically illustrates another example of an inner structure of an MS in a communication system supporting a hybrid MIMO scheme according to an embodiment of the present disclosure.

Referring to FIG. 10, an MS 1000 includes a DSP encoder/decoder 1011, a base band pre-coder/combiner 1013, a plurality of RF chains, e.g., $N_{RF}$ RF chains, i.e., an RF chain #1 1015-1, ..., an RF chain #$NR_F$ 1015-$NR_F$, a plurality of phase shifters, e.g., $N_{RF}*N_R$ phase shifters, i.e., a phase shifter #1 1017-1, ..., a phase shifter #$N_{RF}*N_R$ 1017-$N_{RF}*N_R$, a plurality of adders/dividers, e.g., $N_R$ adders/dividers, i.e., an adder/divider #1 1019-1, ..., an adder/divider #$N_R$ 1019-$N_R$, a plurality of amplifiers, e.g., $N_R$ amplifiers, i.e., an amplifier #1 1021-1, ..., an amplifier #$N_R$ 1021-$N_R$, a plurality of antennas, e.g., $N_R$ antennas, i.e., an antenna #1 1023-1, ..., an antenna #$N_R$ 823-$N_R$, a channel estimation processor 1025, a base band beam controller 1027, and an RF beam controller 1029. Here, a processor including the phase shifter #1 1017-1, ..., the phase shifter #N$_{RF}$*N$_R$ 1017-N$_{RF}$*N$_R$, the adder/divider #1 1019-1, ..., the adder/divider #N$_R$ 1019-N$_R$ is an RF beam forming processor 1030, and a processor including the base band beam controller 1027 and the RF beam controller 1029 is a beam control processor 1040. Further, each of the amplifier #1 1021-1, ..., the amplifier #N$_R$ 1021-N$_R$ may be implemented with, for example, a PA or an LNA.

Meanwhile, a process in which the MS 1000 transmits a signal and a process in which the MS 1000 receives a signal are identical to a process in which a BS 800 transmits a signal and a process in which the BS 800 receives a signal as described in FIG. 8. But, the BS 800 includes N$_T$ antennas unlike the MS 1000, so only a structure and an operation according to the number of antennas are different from those of the BS 800. So, a detailed description of the process in which the MS 1000 transmits the signal and the process in which the MS 1000 receives the signal will be omitted.

While the DSP encoder/decoder 1011, the base band pre-coder/combiner 1013, the RF chain #1 1015-1, ..., the RF chain #N$_{RF}$ 1015-N$_{RF}$, the phase shifter #1 1017-1, ..., the phase shifter #N$_{RF}$*N$_R$ 1017-N$_{RF}$*N$_R$, the adder/divider #1 1019-1, ..., the adder/divider #N$_R$ 1019-N$_R$, the amplifier #1 1021-1, ..., the amplifier #N$_R$ 1021-N$_R$, the antenna #1 1023-1, ..., the antenna #N$_R$ 1023-N$_R$, the channel estimation processor 1025, the base band beam controller 1027, and the RF beam controller 1029 are described in the MS 1000 as separate units in FIG. 10, however, the MS 1000 may be implemented as a form that at least two of the DSP encoder/decoder 1011, the base band pre-coder/combiner 1013, the RF chain #1 1015-1, ..., the RF chain #N$_{RF}$ 1015-N$_{RF}$, the phase shifter #1 1017-1, ..., the phase shifter #N$_{RF}$*N$_R$ 1017-N$_{RF}$*N$_R$, the adder/divider #1 1019-1, ..., the adder/divider #N$_R$ 1019-N$_R$, the amplifier #1 1021-1, ..., the amplifier #N$_R$ 1021-N$_R$, the antenna #1 1023-1, ..., the antenna #N$_R$ 1023-N$_R$, the channel estimation processor 1025, the base band beam controller 1027, and the RF beam controller 1029 are incorporated into a single unit.

While the phase shifter #1 1017-1, ..., the phase shifter #N$_{RF}$*N$_R$ 1017-N$_{RF}$*N$_R$, the adder/divider #1 1019-1, ..., the adder/divider #N$_R$ 1019-N$_R$ are described in the RF beam forming processor 1030 as separate units in FIG. 10, however, the RF beam forming processor 1030 may be implemented as a form that at least two of the phase shifter #1 1017-1, ..., the phase shifter #N$_{RF}$*N$_R$ 1017-N$_{RF}$*N$_R$, the adder/divider #1 1019-1, ..., the adder/divider #N$_R$ 1019-N$_R$ are incorporated into a single unit.

While the base band beam controller 1027 and the RF beam controller 1029 are described in the beam control processor 1040 as separate units in FIG. 10, however, the beam control processor 1040 may be implemented as a form that the base band beam controller 1027 and the RF beam controller 1029 are incorporated into a single unit.

Another example of an inner structure of an MS in a communication system supporting a hybrid MIMO scheme according to an embodiment of the present disclosure has been described with reference to FIG. 10, and a transmission performance in a communication system supporting a hybrid MIMO scheme according to an embodiment of the present disclosure will be described with reference to FIG. 11.

Figure 11:
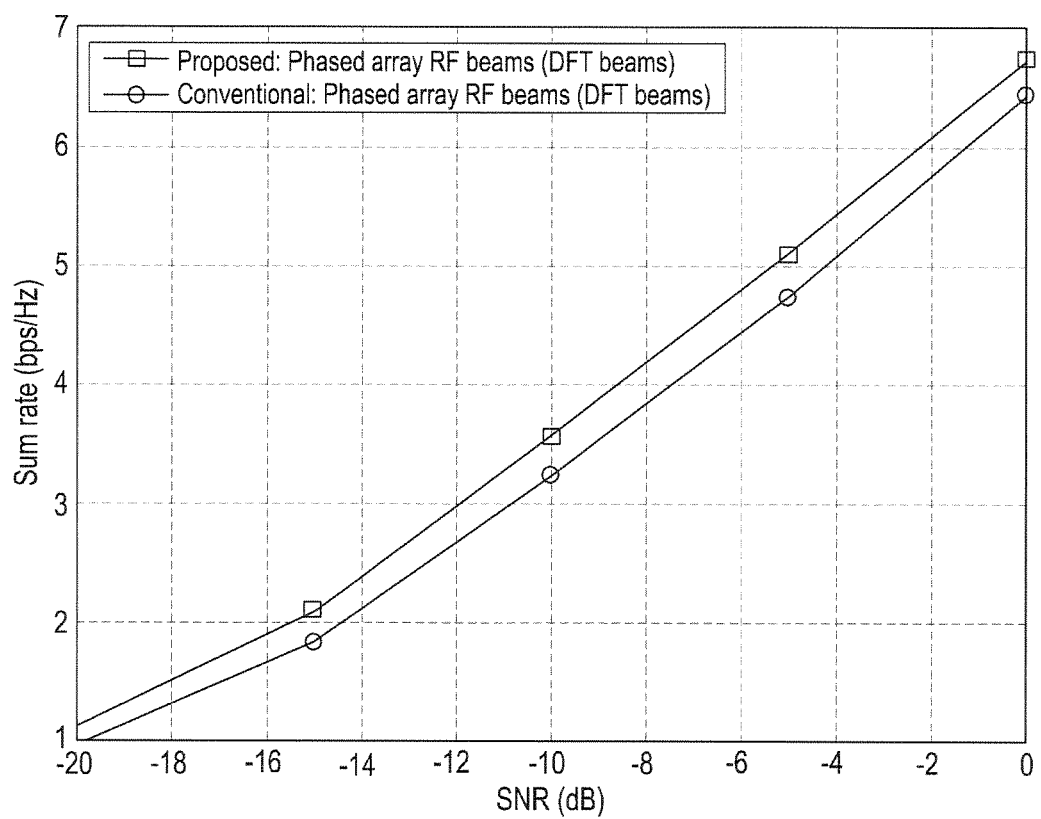
FIG. 11 is a graph schematically illustrating a transmission performance in a communication system supporting a hybrid MIMO scheme according to an embodiment of the present disclosure.

FIG. 11 is a graph schematically illustrating a transmission performance in a communication system supporting a hybrid MIMO scheme according to an embodiment of the present disclosure.

Referring to FIG. 11, a graph shown in FIG. 11 is a graph acquired in a case of assuming that a BS includes 32 antennas, an MS includes 8 antennas, and a discrete Fourier transform (DFT) beam is used as a training beam, and a single-user MIMO environment.

In FIG. 11, a graph labeled as "Proposed: Phased array RF beams (DFT be s)" is a graph acquired in a case that a beam operating process proposed in an embodiment of the present disclosure is applied, and a graph labeled as "Conventional: Phased array RF beams (DFT beams)" is a graph acquired in a case that an existing beam operating process is applied.

As shown in FIG. 11, a data transmission performance which may be acquired by applying a beam operating process proposed in an embodiment of the present disclosure is enhanced by about 7% compared to a data transmission performance which may be acquired by applying an existing beam operating process. That is, it will be understood that an optimal beam may be selected if a beam operating process proposed in an embodiment of the present disclosure is applied, so a data transmission performance may be enhanced.

Further, in FIG. 11, a data transmission performance is acquired in a state of assuming that a BS includes 32 antennas, an MS includes 8 antennas, and a DFT beam is used as a training beam, and a single-user MIMO environment, so, if the assumption is changed, a data transmission performance acquired by applying a beam operating process proposed in an embodiment of the present disclosure may be additionally enhanced compared to a data transmission performance acquired in an existing beam operating process.

An embodiment of the present disclosure enables to operate a beam in a communication system supporting a hybrid MIMO scheme.

Further, an embodiment of the present disclosure enables to operate a beam thereby enhancing a transmission performance in a communication system supporting a hybrid MIMO scheme.

Further, an embodiment of the present disclosure enables to operate a beam thereby decreasing signaling overhead in a communication system supporting a hybrid MIMO scheme.

Further, an embodiment of the present disclosure enables to operate a beam thereby decreasing processing complexity in a communication system supporting a hybrid MIMO scheme.

Further, an embodiment of the present disclosure enables to operate a beam by considering an mm-wave cellular communication in a communication system supporting a hybrid MIMO scheme.

Further, an embodiment of the present enables to operate a beam based on channel status in a communication system supporting a hybrid MIMO scheme.

Further, an embodiment of the present disclosure enables to operate a beam based on a beam training process in a communication system supporting a hybrid MIMO scheme.

Further, an embodiment of the present disclosure proposes enables to operate a beam based on a uplink sounding process in a communication system supporting a hybrid MIMO scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a beam by a mobile station (MS) in a communication system, the method comprising:
   receiving, from a base station (BS), information indicating a number of beams used in a beam training process by the BS;
   receiving, from the BS, a downlink reference signal (RS);
   performing, based on the number of beams used by the BS, a channel estimating process using the downlink RS; and
   transmitting, to the BS, information indicating a number of beams used by the MS,
   wherein performing the channel estimating process using the downlink RS comprises performing, based on the number of beams used by the BS, the channel estimating process using the downlink RS and a compressed sensing scheme.

2. The method of claim 1, further comprising:
   transmitting an uplink RS to the BS.

3. The method of claim 2, further comprising:
   receiving downlink data from the BS; and
   performing a channel estimating process based on the downlink data, and determining a reception beam pattern based on a channel estimated result according to the channel estimating process.

4. A method for operating a beam by a base station (BS) in a communication system, the method comprising:
   transmitting, to a mobile station (MS), information indicating a number of beams used in a beam training process by the BS;
   transmitting, to the MS, a downlink reference signal (RS); and
   receiving, from the MS, information indicating a number of beams used by the MS; and
   performing, based on the number of beams used by the MS, a channel estimating process using an uplink RS and a compressed sensing scheme.

5. The method of claim 4, further comprising:
   receiving the uplink RS from the MS.

6. The method of claim 4, further comprising:
   determining a transmission beam pattern based on a channel estimated result according to the channel estimating process; and
   transmitting downlink data to the MS using the transmission beam pattern.

7. A mobile station (MS) in a communication system, the MS comprising:
   a receiver configured to receive, from a base station (BS), information indicating a number of beams used in a beam training process by the BS, and to receive, from the BS, a downlink reference signal (RS); and
   a controller configured to perform, based on the number of beams used by the BS, a channel estimating process using the downlink RS; and
   a transmitter configured to transmit, to the BS, information indicating a number of beams to be used by the MS,
   wherein the controller performs, based on the number of beams used by the BS, the channel estimating process using the downlink RS and a compressed sensing scheme.

8. The MS of claim 7, wherein the transmitter transmits an uplink RS to the BS.

9. The MS of claim 8, wherein the receiver receives downlink data from the BS, and
   wherein the controller further performs a channel estimating process based on the downlink data, and determines a reception beam pattern based on a channel estimated result according to the channel estimating process.

10. A base station (BS) in a communication system, the BS comprising:
   a transmitter configured to transmit, to a mobile station (MS), information indicating a number of beams used in a beam training process by the BS, and to transmit, to the MS, a downlink reference signal (RS); and
   a receiver configured to receive, from the MS, information indicating a number of beams used by the MS; and
   a controller configured to perform, based on the number of beams used by the MS, a channel estimating process using an uplink RS and a compressed sensing scheme.

11. The BS of claim 10, wherein the receiver receives the uplink RS from the MS.

12. The BS of claim 11,
  wherein the controller further determines a transmission beam pattern based on a channel estimated result according to the channel estimating process, and
  wherein the transmitter further transmits downlink data to the MS using the transmission beam pattern.

* * * * *